United States Patent [19]

Dorner et al.

[11] 4,384,386
[45] May 24, 1983

[54] MOTOR FOR ROTATING BRUSH

[75] Inventors: John R. Dorner; Jon F. Wiltse; Roger E. Hollis, all of Watertown, N.Y.

[73] Assignee: The Scott & Fetzer Company, Cleveland, Ohio

[21] Appl. No.: 220,305

[22] Filed: Dec. 29, 1980

Related U.S. Application Data

[62] Division of Ser. No. 944,864, Sep. 22, 1978, Pat. No. 4,268,769.

[51] Int. Cl.³ .................. A47L 5/30; A47L 9/28; H02K 7/00
[52] U.S. Cl. ..................... 15/377; 15/389; 15/412; 310/67 R; 310/266
[58] Field of Search ............ 15/377, 389, 412; 310/67 R, 40 MM, 266

[56] References Cited

U.S. PATENT DOCUMENTS

| Re. 27,537 | 12/1972 | Fisher | 310/266 |
|---|---|---|---|
| 1,953,340 | 4/1934 | Doemling | 15/389 |
| 2,952,788 | 9/1960 | Volkerling | 310/40 MM |
| 3,100,907 | 8/1963 | Schwertl | 15/377 |
| 3,312,846 | 4/1967 | Henry-Baudot | 310/266 |
| 3,360,668 | 12/1967 | Faulhaber | 310/266 X |
| 3,675,102 | 7/1972 | Sidorov | 310/67 |
| 3,870,914 | 3/1975 | Walker | 310/219 |
| 3,974,406 | 8/1976 | Wehde | 310/67 |
| 4,121,107 | 10/1978 | Adelski | 310/67 |
| 4,123,679 | 10/1978 | Miyasaka | 310/40 MM |
| 4,125,791 | 11/1978 | Futterer | 310/266 |

Primary Examiner—Chris K. Moore
Attorney, Agent, or Firm—Pearne, Gordon, Sessions, McCoy, Granger & Tilberry

[57] ABSTRACT

An electric motor construction and method particularly adapted for integration in rotating final drive members. The motor includes a hollow armature assembly rotatably supported about a permanent magnet stator. The armature assembly includes a winding preferably fabricated by printed circuit techniques in the form of flat conductors clad on a flexible dielectric sheet rolled into a tube and a soft magnetic tube circumferentially surrounding the winding to provide a structural support and a heat sink for the winding and a flux return path for the poles of the permanent magnet stator. In the preferred embodiment, the motor is integrated in the cleaning brush of a vacuum sweeper unit.

3 Claims, 5 Drawing Figures

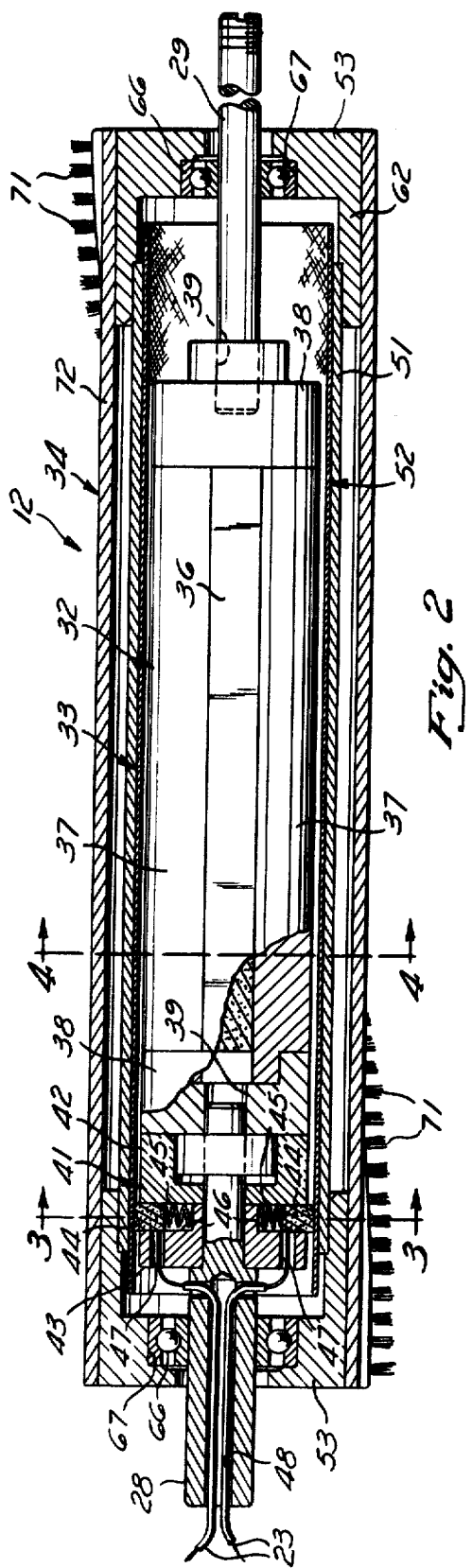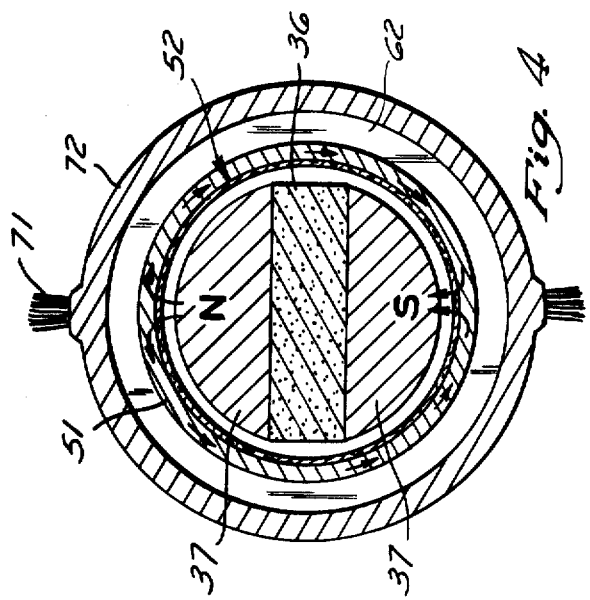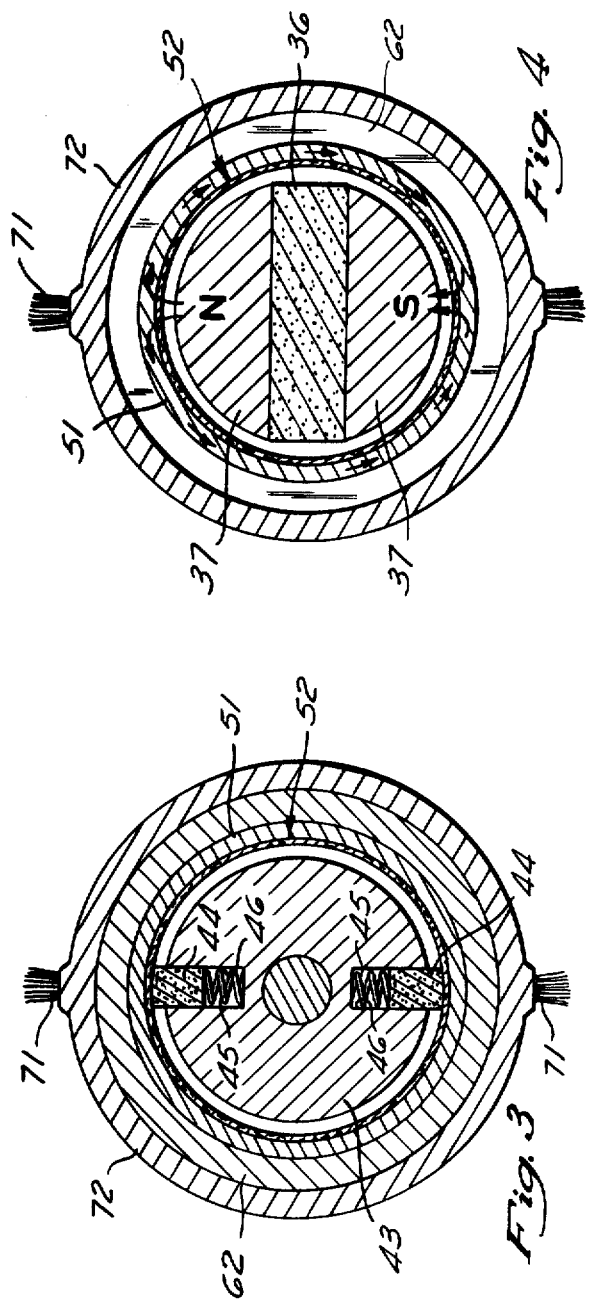

MOTOR FOR ROTATING BRUSH

This is a division of application Ser. No. 944,864, filed Sept. 22, 1978, now U.S. Pat. No. 4,268,769, May 19, 1981.

BACKGROUND OF THE INVENTION

The invention relates to dynamoelectric devices and, more specifically, to an electric motor construction particularly adapted for integration into cylindrical rotating working members.

PRIOR ART

In both commercial and consumer fields, electric motors have not generally been integrated into the actual work performing elements which they ultimately drive. More commonly, an electric motor is provided as a separate component in a system and is connected to the work performing element through a form of transmission system often including belts, chains, gears, fluid power, and the like. Besides adding to the cost of a system, power transmitting elements are subject to mechanical wear and possible premature failure. A typical reason for use of separate motor units is space limitations in a device or element of a device which physically prevent incorporation of a motor of conventional construction.

A consumer product which commonly utilizes a separate motor and drive system is a vacuum cleaner nozzle attachment incorporating a power-driven beater brush. Typically, these devices employ a cylindrical beater brush driven through a belt by a motor mounted laterally of the brush. Such an arrangement has several disadvantages, as outlined above, including, besides the usual cost of individual elements, inevitable belt wear, and relatively high bearing loads imposed by belt tension.

Motors incorporating printed circuit armatures have not been widely used in commercial and consumer applications. Such motors have been primarily limited in use to applications where low armature inertia is of major importance. An example of a hollow printed circuit armature is disclosed in British Pat. No. 714,677, published in 1954. It is known to construct an electric motor with a hollow rotating armature by disposing permanent magnets within the armature and encircling the armature with a stationary cylinder of soft magnetic material such as steel to provide a return path for magnetic flux between the poles of the permanent magnet.

SUMMARY OF THE INVENTION

A motor constructed in accordance with the invention utilizes a hollow rotating armature which comprises a winding encircled by and fixed to a tube of soft magnetic material, such as steel. The soft magnetic armature tube serves as a flux return path for magnetic field poles, which are disposed within the armature, as a heat sink and structural support for the armature winding and, where desired, as a final drive element in a power drive system. The hollow armature construction and centrally disposed magnetic poles cooperate in providing a motor structure which is particularly suited for incorporation into small diameter units, which are readily integrated into rotating devices which have previously been remotely powered. The disclosed electric motor, by virtue of its unique construction, is sufficiently versatile to enable it to be integrated into a variety of mechanical devices, while affording savings in physical size, weight, and cost.

In the illustrated embodiment, the motor is integrated with a beater brush of a household vacuum cleaner nozzle. The beater brush is fixed directly on the armature tube so that separate bearing supports for the motor and brush, as well as drive belts or the like, are avoided. Ideally, the armature winding is constructed by printed circuit techniques whereby conductors are provided on opposite sides of a flexible sheet which is rolled into a cylinder and disposed within the supporting armature tube.

Economies associated with printed circuit fabrication of the armature winding offer a motor construction which is highly cost competitive in both low and high volume production. Alteration in size or pattern of the winding dictated by changes in motor size and application require minimal tooling expense. Labor costs in the production of armature windings and completed motors are likewise relatively low.

BRIEF DESCRIPTION OF THE DRAWINGS

FIG. 2 is a longitudinal, cross sectional view of an integrated beater brush and electric motor as used in the sweeper unit of FIG. 1;

FIG. 3 is a transverse, cross sectional view of the beater brush and motor, taken at the plane indicated by the line 3—3 of FIG. 2;

FIG. 4 is a transverse, cross sectional view of the beater brush and motor, taken at the plane indicated at the line 4—4 of FIG. 2.

DESCRIPTION OF THE PREFERRED EMBODIMENT

Figure 1:
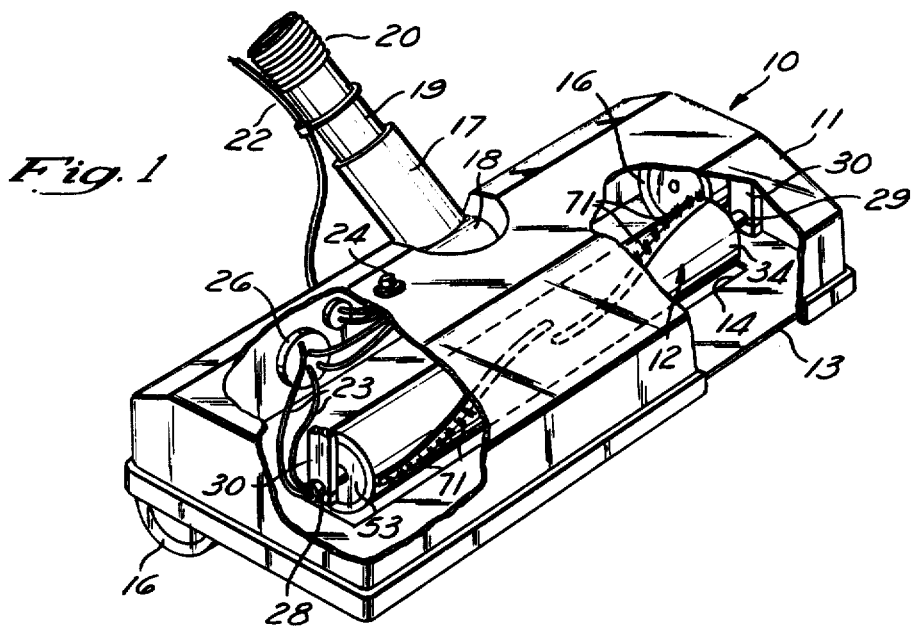
FIG. 1 is a perspective view of a vacuum sweeper unit, with portions of its housing broken away to reveal interior elements, embodying principles of the invention.

Referring now to the figures, there is illustrated a vacuum sweeper unit 10 particularly suited for use as an attachment for residential and like vacuum cleaners of the type not otherwise provided with a mechanical beater or sweeper brush. The vacuum sweeper unit 10 comprises a vacuum nozzle housing 11, preferably molded of suitable plastic, and an integrated motor brush 12 rotatably mounted within the housing.

A lower face of the nozzle housing 11 is formed by a wall 13, which is provided with an elongated aperture 14 through which a longitudinal side face of the motor brush 12 extends for contact with a carpet or other floor surface. The nozzle housing 11 is adapted to be supported on a floor surface by a pair of wheels 16 rotatably supported within opposite ends of the housing.

A coupler tube 17 has a spherical segment 18 cooperating with a complementary socket formed in the housing 11 for universal coupling therewith. The coupler 17 is adapted to be joined, for example, by a conventional taper friction fit with an end fitting 19 on the end of a flexible hose 20. A vacuum in the flexible hose 20 is thereby applied to the interior of the housing 11 to draw air and dirt through the aperture 14 into the housing.

An electrical cord 22 following the flexible hose 20 conducts utility supplied electrical power to the motor brush 12 through a manually resettable circuit breaker 24 and electrical lead wires 23. The circuit breaker 24 guards against overheating of the motor 12. A conventional solid state, full wave rectifier 26 in the housing 11 and in series with the cord 22 and motor lead wires 23 converts alternating current to direct current for operation of the motor brush 12.

Nonrotating shaft ends 28,29 of the motor brush 12 are fixed on supports 30, ideally integrally formed on the interior of the housing 11. With particular reference to FIGS. 2–4, the motor brush 12 is an elongated, cylindrical structure comprising a central pole stator assembly 32, a hollow armature or rotor assembly 33, and a beater brush 34 concentrically fixed on the armature assembly. The pole assembly 32 includes a permanent magnet flat bar 36 of rectangular cross section. Pole pieces 37 of sintered powdered iron each formed with a generally chordal cross section, are disposed on opposite faces of the magnet 36. FIG. 4 illustrates the orientation of the two magnetic poles of the assembly 32. The pole pieces 37 and magnet 36 are supported and retained in their illustrated, relative positions by circular end caps 38. The shaft ends 28 and 29 are press-fitted or otherwise fixed into central bores 39 formed in the pole end caps 38, with the result that the shaft ends are coaxial and are enabled to support the pole assembly 32.

At one end of the pole assembly 32 there is disposed a brush holder assembly 41, in the illustrated example, formed of axially and inner and outer circular elements 42 and 43, respectively. Electrical brushes 44 and springs 45 are carried in oppositely extending radial slots 46 formed in the outer holder element 43. The electrical lead wires 23 pass from the brushes 44 through axial holes 47 in the outer holder element 43 and an axial bore 48 in the associated shaft end 28.

Figure 5:
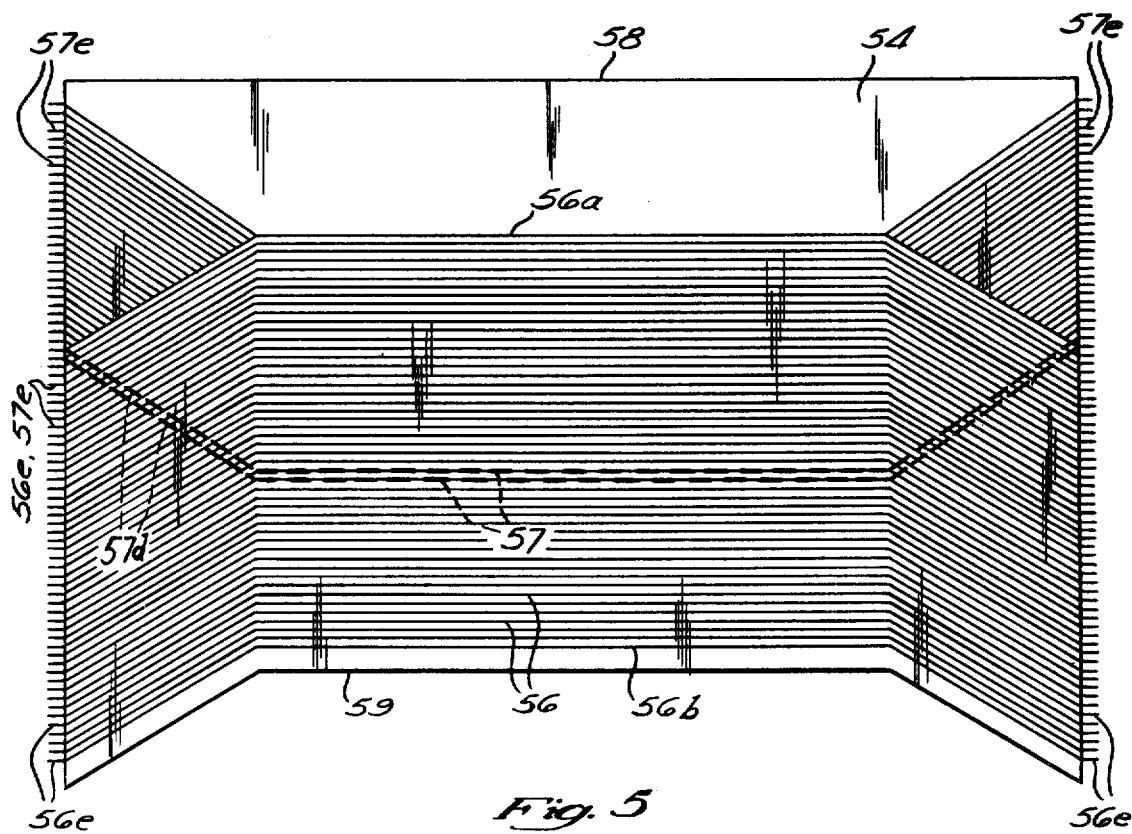
FIG. 5 illustrates an armature winding in planar form.

The hollow armature assembly 33 includes a cylindrical circumferentially continuous tube 51, a winding unit 52 within the tube, and end caps 53 at each end of the tube. The tube 51 is formed of soft, magnetic material such as steel and, as indicated in FIG. 2, has an axial length somewhat greater than the pole assembly 32. The winding unit 52, illustrated in a planar development in FIG. 5, is preferably fabricated by conventional printed circuit techniques and comprises a flexible, electrically insulating or dielectric sheet 54 of suitable conventional material and a series of flat conducting strips 56 and 57, preferably of copper, clad on opposite sides of the sheet. The conductor strips 56 and 57 on each side of the sheet 54 include longitudinal sections which, in the illustrated embodiment, overlie one another along the midportion of the sheet 54 and diagonal sections 56d,57d at each end of the sheet. Desirably, the conducting strips 56 and 57 are produced on the sheet 54 by any suitable commonly used printed circuit manufacturing process, such as material removal, film deposition, or mold and die.

Ideally, after processing to form the individual conducting strips 56 and 57 on the sheet 54, the sheet is rolled into a tube so that conductors 56a and 56b on opposite sides of the pattern of strips 56 are immediately adjacent one another. The conducting strips 56 on the outer surface of the rolled sheet 54 are preferably covered with an electrically insulating film of suitable material sprayed or otherwise disposed thereon. Alternatively, the electrically insulating film may be applied on the interior of the tube 51. The rolled winding unit 52, formed by the sheet 54 and conductors 56,57 is installed in the cylindrical tube 51 and held fixed in position by a suitable adhesive or other means applied as needed along the full interface between the unit 52 and tube 51 and/or at the ends of the winding unit, such that the winding unit is radially supported by the tube at least along the length of the pole assembly 32.

Preferably after being fixed in the tube 51, the overlying ends, designated 56e,57e, of the conductors 56 and 57 on opposite sides of the sheet 54 are individually electrically connected by soldering, welding, or the like. As indicated in FIG. 5, the conductor ends 56e,57e may extend axially a short distance beyond the adjacent edges of the sheet 54 to facilitate their interconnections. The diagonal conductor segments 57d on the underside surface of the sheet 54 in FIG. 5 and on the inner surface of the winding unit 52 at the left in FIG. 2 are selfcommutating with the brushes 44, as suggested in FIGS. 2 and 3.

Overlap of the longitudinal edges, designated 58 and 59 in FIG. 5, of the sheet 54 is such that upon rotation with respect to the brushes 44, the edge on the underside of the resulting winding unit tube trails the leading edge so that the brushes are not caught by this edge. Where desired, the sheet 54 may be die-cut to a width in relation to the inside diameter of the tube 51 such that the longitudinal edges 58,59 abut, and thereby avoid overlapping. It is contemplated that as an alternative to the use of the flexible sheet 54, where desired, the conductors 56,57 may be applied to or otherwise formed on a performed rigid tube, preferably circumferentially continuous and of electrically insulating material, forming the equivalent of the flexible sheet.

The elements of the hollow armature or rotor assembly 33 are dimensioned with respect to the pole assembly 32 such that the winding unit 52 is closely spaced radially outward from the pole assembly. FIG. 4 illustrates the general character of the magnetic fields produced by the permanent magnet 36. As indicated, the steel tube 51 provides back-up iron for magnetic flux return paths between the poles 37. In addition to the function of providing a flux return path for the magnetic fields, the tube 51 physically supports the armature winding unit 52 and allows dynamoelectric torque developed in this unit to be transmitted directly to the tube. Accordingly, the armature winding unit 52 may be constructed of relatively light materials while being capable of developing relatively high torque loads. Further, the tube 51, being in direct heat transmitting relationship with the winding unit 52 along substantially the full length of the winding unit, by virtue of direct contact therebetween or indirect contact through a thin film of adhesive, provides an efficient heat sink for the winding unit, and thereby reduces problems associated with electrical current-induced heat buildup in the winding unit.

The armature assembly 33 is rotatably supported on the shaft ends 28 and 29 by the circular end caps 53. The end caps 53 formed of steel or other suitable material each include an axially extending, successively counterbored skirt 62 into which the tube 51 is pressed, and the ends of the winding unit 52 are received. Antifriction bearings 66, with their outer races pressed into inner bores 67 of the end caps 53 and their inner races engaging the shaft ends 28 and 29, rotatably support the end caps.

The cylindrical beater brush 34 of the motor brush 12 is fixed directly on the armature assembly 33. The beater brush 34 includes radially extending tufts 71 of fibers spirally arranged along the exterior of a cylindrical tube 72 in a conventional manner for mechanically brushing a floor or other surface. The brush tube 72 is supported at its ends by engagement of its interior with the exterior of the armature end caps 53 with an interference fit therebetween or other suitable means of fastening. It is thus seen that the motor bearings 66 serve to rotatably support both the armature assembly 33 and the beater brush 34.

Heat generated electrically in the winding unit 52 and absorbed by the magnetic tube 51 is transmitted to the brush tube 72 by conduction through the brush end caps 53 and by radiation directly to the brush tube. Thus, substantially all of the heat generated in the winding unit 52 is transmitted in this manner to the outer surface of the cleaning brush tube 72, whereby air flow over the beater brush 34 induced by rotation of the brush and a vacuum in the housing 11 functions to cool the armature assembly 33. Where desired, it is contemplated that the brush tufts 71 may be fixed directly to the armature tube 51 to eliminate the need for the separate brush tube 72.

While the invention has been described in connection with a specific embodiment thereof, it is to be clearly understood that this is done only by way of example, and not as a limitation to the scope of the invention as set forth in the objects thereof and in the appended claims. For instance, it is contemplated that the disclosed motor may be integrated into the final drive member of other products or devices, such as within a roller of a multiple roller conveyor or a roller of a belt conveyor system.

What is claimed is:

1. A vacuum cleaner and sweeper unit comprising a housing, said housing having an interior, means defining a lower face of the housing, and means for coupling a vacuum hose to the housing interior, a cylindrical rug cleaning brush rotatably supported within said housing and having a longitudinal side exposed from the interior of the housing through said face, electric motor means within said brush, said electric motor means including rotor means directly connected to said cleaning brush and rotatably supported by common bearing means for coaxial rotation together, said rotor comprising a hollow armature including a cylindrical tube of soft magnetic material and a winding unit disposed within said magnetic tube, magnetic field producing means disposed within said armature, electric brushes within said armature, and commutating means on said armature cooperating with said electrical brushes to supply electrical current to said armature, said magnetic tube providing a return path for magnetic flux produced by said magnetic field producing means, said winding unit being fixed to said magnetic tube, whereby said magnetic tube radially supports said winding unit substantially along its full axial length such that said magnetic tube is adapted to operate as a heat sink for said winding unit, said magnetic tube being arranged to transmit substantially all of the heat developed by said winding unit to the outer surface of said cleaning brush, whereby air flow over said cleaning brush induced by rotation of said cleaning brush and a vacuum in said housing functions to cool said armature.

2. A vacuum cleaner and sweeper unit as set forth in claim 1, wherein said winding unit includes a plurality of flat conductors supported on a dielectric carrier in the manner of a printed circuit.

3. A vacuum cleaner and sweeper unit as set forth in claim 2, wherein said dielectric carrier is a rigid tube formed prior to provision of said flat conductors thereon.

* * * * *